United States Patent [19]

Skidanenko et al.

[11] Patent Number: 4,552,994
[45] Date of Patent: Nov. 12, 1985

[54] APPARATUS FOR ISOLATING THE VOICE FREQUENCY PATH FROM THE FLOATING BATTERY FEED DURING SIGNALLING

[75] Inventors: Constantine V. Skidanenko, Menlo Park; Gregor D. McGibbon, San Carlos, both of Calif.

[73] Assignee: GTE Lenkurt Incorporated Communication Systems, Phoenix, Ariz.

[21] Appl. No.: 449,026

[22] Filed: Dec. 13, 1982

[51] Int. Cl.[4] .............................................. H04M 7/00
[52] U.S. Cl. ............................ 179/16 AA; 179/18 FA
[58] Field of Search .............. 179/16 E, 16 EA, 16 F, 179/18 F, 18 FA, 19, 20, 170 R, 6.15, 6.16, 84 R

[56] References Cited

U.S. PATENT DOCUMENTS

| 4,056,691 | 11/1977 | Freimanis et al. | 179/16 F |
| 4,122,305 | 10/1978 | Fish et al. | 179/6 E |
| 4,315,106 | 2/1982 | Chea, Jr. | 179/16 F |
| 4,423,292 | 12/1983 | Turek | 179/18 FA |

OTHER PUBLICATIONS

"D4 Digital Channel Bank Family", W. G. Albert et al., The Bell System Technical Journal, vol. 61, No. 9, Nov. 1982, pp. 2757, 2783.
"Per-Channel Equipment," C. L. Maddox et al., The Bell System Technical Journal, vol. 51, No. 8, Oct. 1972, pp. 1659-1674.
"The D3 Channel Bank", W. B. Gaunt et al., Bell Labs Record, Aug. 1972, pp. 229-233.
"91253 Dial Pulse Originating Channel Unit," GTE Practices Engineering-Plant Series, Section 342-91-1-151, Issue 2, Jul. 1979, pp. 1-12.

"Digital Channel Bank Requirements and Objectives", Bell Systems Technical Reference, Nov. 1982, pp. 1-11.
"91403 DPO and 91405 DPT Channel Units," GTE Practices Engineering-Plant Series, Section 342-91-1-117, Issue 1, Jun. 1979, pp. 1-8.
"91403 DPO and 91405 DPT Channel Units", GTE Practices, Addendum 342-911-117, Issue 1, Aug. 1979, pp. 1-3.
"9004A PCM Channel Bank", GTE Practices Engineering-Plant Series, Section 342-911-111, Issue 2, Apr. 1980, pp. 1-70.
"91250 Stop Dial/Wink Originating Channel Unit", GTE Practices, Engineering-Plant Series, Section 342-911-148, Issue 2, Jul. 1979, pp. 1-6.
"91258 FXO and 91259 FXS Channel Units", GTE Practices, Engineering Plant Series, Section 342-91-1-155, Issue 3, Aug. 1979, pp. 1-18.

Primary Examiner—Thomas W. Brown
Assistant Examiner—R. Vaas
Attorney, Agent, or Firm—Leonard R. Cool; Russell A. Cannon

[57] ABSTRACT

In a floating battery feed circuit, the voice frequency is normally connected on the subscriber loop side of the blocking capacitor which is used to prevent the DC loop current from flowing in the winding of the associated voice frequency transformer. This capacitor adversely offsets the dial pulse signals. An optical isolator is responsive to the answer control signal from a dial pulse originating (DPO) channel unit and provides a control signal to a switching circuit, which connects the voice frequency circuit to the loop during answer periods and disconnects the voice frequency circuit from the loop during dial pulse signaling.

4 Claims, 3 Drawing Figures

APPARATUS FOR ISOLATING THE VOICE FREQUENCY PATH FROM THE FLOATING BATTERY FEED DURING SIGNALLING

BACKGROUND OF THE INVENTION

1. Field of the Invention

This invention relates to a telephone subscriber loop, and in particular to apparatus for isolating the voice frequency circuit from an associated floating battery feed circuit during dial pulsing.

2. Background Description

The problem of supplying operating power from a central office to a subscriber telephone set is a continuing one. The arrangements for doing so are variously described as line feed circuits and telephone subscriber line circuits. For the standard telephone circuit the technique for supplying the operating current to the subscriber loop consisted essentially of two resistors which are designated as line feed resistors and these are in series with the central office battery. The voltage amplitude of the battery is in the range of 48 to 60 volts and the line feed resistors typically have resistance values ranging from 200 to 800 ohms depending upon the particular telephone exchange. These line feed resistors are selected at the central office to have a value which would produce the proper line current for the loop resistance characteristic expected by the telephone instrument to which it is to be connected.

More recently, floating battery feed circuits, which are more energy efficient, have been devised. One such circuit is disclosed in the U.S. Pat. No. 4,056,691 entitled, "Telephone Subscriber Line Circuit", L. Freimanis et al., granted Nov. 1, 1977. In the referenced patent it is clear that the battery feed current is coupled to the telephone instrument from a source of positive and negative potential that "floats" (has a very high impedance) relative to earth ground. The main advantage of this method is that of very good longitudinal balance, which provides good immunity to AC induction. As shown in FIG. 3 of the referenced patent a transformer is included which has, in addition to the normal primary and secondary windings, a plurality of sense windings which are used to ensure a constant current supply to the subscriber loop when the battery feed circuit is turned on. Further, a number of external control circuits are required. For example, a scan flip-flop is used for status checks.

A technique by which a regulated loop current may be applied to the subscriber line is disclosed in U.S. Pat. No. 4,315,106, entitled "Apparatus For Regulating Current Supplied To A Telephone Line Signal Of The Type Employed In Digital Telephone Systems", inventor R. C. W. Chea, Jr., granted Feb. 9, 1982. In order to reduce the power consumption and thereby improve the energy efficiency, the circuit disclosed replaces the battery and series line feed resistors with the power supply circuit in which the line voltage is monitored and this information is used to control the actual supply voltage via the line feed resistors to the subscriber loop. By using the control technique the size of the line feed resistors can be reduced so that power dissipation is also reduced.

SUMMARY OF THE INVENTION

In a circuit for providing floating battery feed current to a subscriber loop, a circuit for disassociating an associated voice frequency circuit from the subscriber loop during signaling includes transfer apparatus which is responsive to ones of the signaling and answer circuit states from a DPOU for isolating the voice frequency circuit from the loop during dial pulsing.

DETAILED DESCRIPTION OF THE INVENTION

Figure 1:
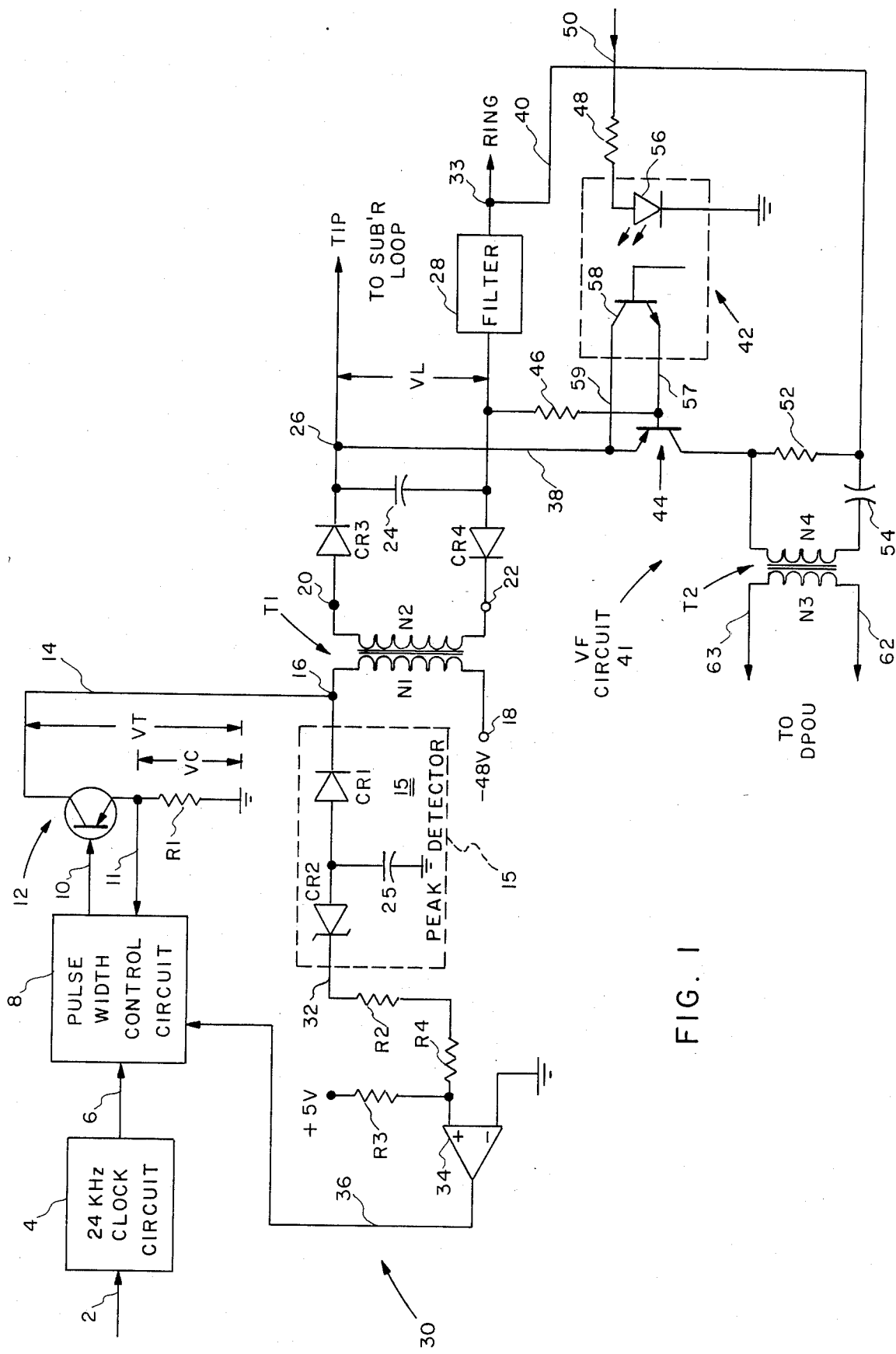
FIG. 1 shows a simplified schematic diagram illustrating the basic elements of a preferred embodiment of the invention.

Referring now to FIG. 1, a floating battery feed circuit which inexpensively provides a controlled loop current to a subscriber loop is illustrated. A clock 4 provides one microsecond pulses at a 24 KHz rate on path 6. Clock 4 may receive timing information from the local switching office, particularly if it is a digital switching office. Because the common sampling frequency for PCM voice frequency telephone channels is 8 KHz, it is expected that this 8 KHz frequency would be available and could be provided to the synchronizing input of the clock circuit via path 2. This provides a significant advantage in that the synchronization of the clock circuit with the local voice frequency sampling rate would preclude the introduction of spurious tones into a PCM coded signal. While the 8 KHz rate could provide for satisfactory operation, a higher clock pulse rate of 24 KHz was employed. The higher frequency allows for easier separation of the switching frequency from the voice frequency. Because of switching time limitations on the switching transistor (12) 24 KHz was found to be a practical upper limit on the clock rate.

Reverting back to FIG. 1, it should be understood that the leading edge of the clock pulse causes the pulse width control circuit 8 to provide drive current on path 10 to transistor circuitry 12. Transistor circuit 12 then goes into saturation with current flow between ground and the −48 volt battery connection at terminal 18 of transformer T1. Note that the current flows through the primary winding N1 of transformer T1 via junction 16 and path 14 to the collector of transistor circuit 12. The current flowing through the emitter resistor R1 provides the pulse width control voltage VC across resistor R1 and this voltage is fed back to the pulse width control circuit via path 11. When the voltage VC reaches a predetermined value, pulse width control circuit 8 is shut down and the drive to transistor circuit 12 is removed.

When the current begins to rise in the primary winding N1 of transformer T1, it increases in a substantially linear fashion, and this can be observed as a ramp voltage across resistor R1. The current in the winding N1 continues to rise until the voltage VC reaches a predetermined value and the base drive to transistor 12 is turned off. At this point, the energy stored in the primary N1 winding must be dissipated, and the collapsing field will induce a voltage into the secondary winding N2 which is rectified by diode CR3 and the rectified voltage is stored in capacitor 24. This stored voltage is represented as VL. Diode CR4 improves longitudinal balance. During idle, i.e., on-hook conditions an "idle power shutdown" circuit 30 is in operation to conserve energy. This circuit consists of peak detector 15, resistors R2–R4 and an operational amplifier 34. The peak detector 15 includes storage capacitor 25 and quick recovery diode CR1. Capacitor 25 stores the voltage appearing between ground and junction 16 and diode CR1 minimizes leakage. Initially capacitor 25 is charged to approximately 48 volts by the battery supply voltage that is applied between terminal 18 and ground, i.e., −48 volts. CR2 is a voltage breakdown diode which is used to fix the operating voltage on capacitor 25 that must be exceeded before the on-hook condition on the subscriber loop is sensed. In a practical implementation, the CR2 breakdown voltage selected was 51 volts. At about 2800 ohms of loop resistance the voltage stored on capacitor 25 exceeds the breakdown voltage, 51 volts, of CR3. As the loop resistance further increases, the voltage across the voltage divider network consisting of resistors R3 and R4 increases. When the loop resistance reaches approximately 4500 ohms, the R3–R4 voltages causes the output of the operational amplifier 34 to change from an open state, i.e. a high resistance, to an output of −5 volts. The effect of the −5 volts on line 36 is to limit the effect of the sync pulses from clock 4 by a gating action within the pulse width control circuit 8. This provides a pulse rate modulation of the drive to transistor 12 such that the power dissipation in the battery feed circuit is reduced significantly as the loop resistance approaches the on-hook condition. This is an immobolizing action and has been designated as "idle power shutdown" as the intent is to minimize total power dissipation in the on-hook state. Only enough of the sync pulses are now allowed to propagate through the control circuitry in order that on-hook to off-hook transistors might be identified. Operation of the floating battery feed circuit is explained in more detail in our copending application, Ser. No. 437,936, filed Nov. 1, 1982.

The voice frequency circuit 41 comprises transformer T2, switching transistor 44 and capacitor 54. The latter blocks the DC from the secondary winding N4 and AC couples the VF signal to T2. In contrast, prior art circuits would include a transformer and a capacitor which are connected directly across the subscriber loop, i.e., tip and ring leads. The transformer in prior art circuits is large, heavy and carries DC current. The invention described herein would not have any DC current flowing in the transformer winding N4. It should be noted that the presence of a capacitor 54 that is continuously connected across the tip and ring leads would seriously distort dial pulses, and would normally require some form of dial pulse correction. Such arrangements are not only complex, but they are also expensive. Further, they do not always provide satisfactory correction of the dial pulses.

Figure 2:
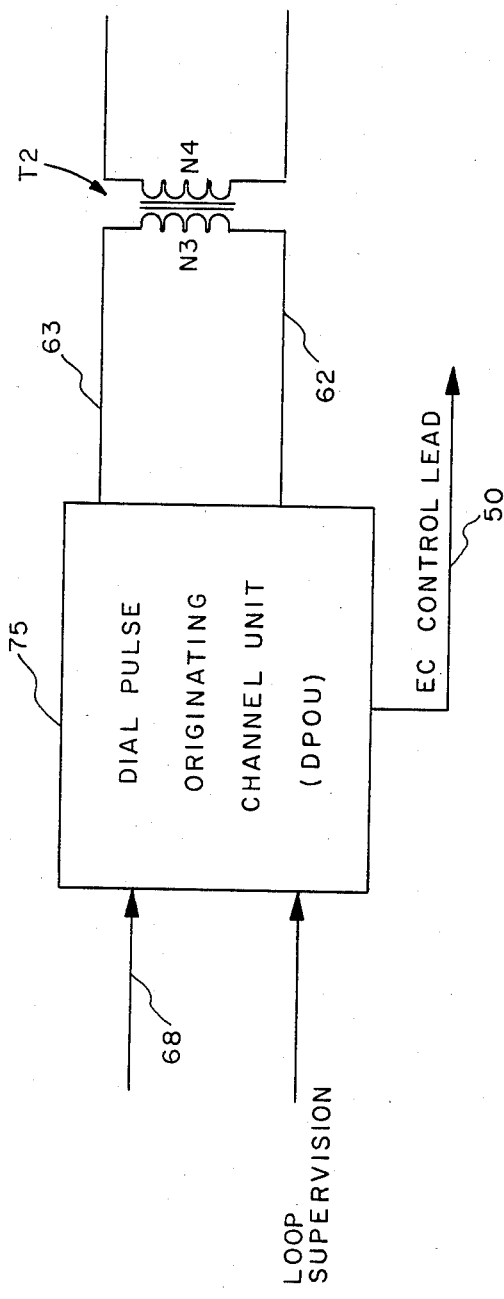
FIG. 2 is an elementary block diagram illustrating the interconnection between a DPO channel unit and the loop.
Figure 3:
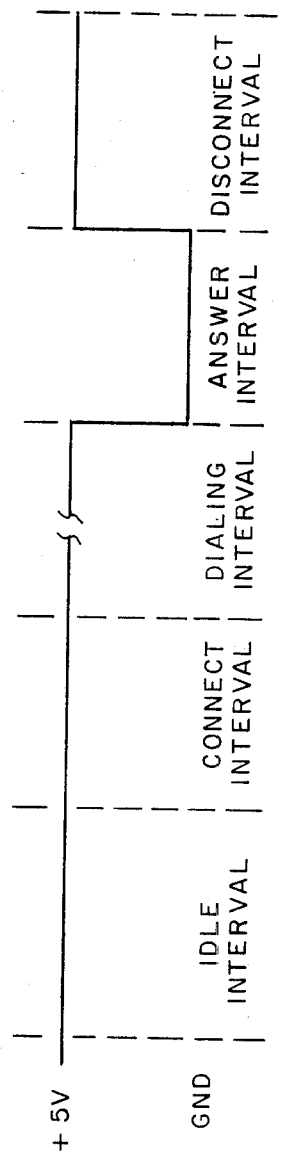
FIG. 3 is a waveform diagram illustrating the 5 states of the Extra C (EC control) lead.

To overcome this problem, a switching transistor 44 is connected between the upper or second terminal of the transformer secondary winding N4 and the tip lead. Base drive is obtained through resistor 46 and optical coupler 42. The light emitting diode 56 is connected to an EC control lead 50 of a Dial Pulse Originating (DPO) Channel Unit (DPOU). Such channel units are well known and one such microprocessor controlled unit is illustrated in block form in FIG. 2 to show the interconnection with the N3 winding of transformer T2 and thus the VF circuit 41. The unit 75 operates to provide status information on the EC lead 50 for five (5) states; idle interval (indicating an on-hook condition), connect interval (indicating an off-hook condition), dialing interval (indicating dial pulsing), answer interval (called party answers), and disconnect interval (when either party hangs up). As shown in FIG. 3 during four of the intervals the lead provides a +5 volt output (binary 1) and during the answer interval the output is ground (binary 0). The status of the EC control lead 50 as provided by unit 25 standard is related to the standard output of a loop supervision portion of the battery feed circuit. A comparator means (not shown) establishes the on-hook and off-hook status of the subscriber loop and responds to subscriber dial pulsing. This information is supplied via path 68 to the DPO channel unit, which is programmed to pass through the 5 different state intervals in the sequence outlined above. In the DPO, a microprocessor may be employed to provide timing and logic functions necessary for identifying the status of the circuit and provide the desired signaling information. The processor is a state machine and provides the five states idle, connect, dialing, answer and disconnect as noted above. The status of the EC control lead is as shown in FIG. 3. As may be seen, it is only during the answer interval that the state of the EC control lead is a ground level or logic "0". With a logic "1" applied to line 50 the transistor 58 turns on which turns off transistor 44. With transistor 44 turned off its collector-to-emitter resistance is very large which effectively removes the VF portion 41 from the subscriber loop circuit on tip and ring lines. During the answer interval that a logic "0" is applied to line 50 transistor 58 turns off for turning on transistor 44. With transistor 44 turned on, its collector-to-emitter resistance is a few ohms, which is effectively a short circuit, for reconnecting the VF portion of the circuit to TIP and RING lines. Resistor 48 is used to limit the current through diode 56. Resistor 46 is used to bias the base emitter junction of transistor 44. Resistor 52 is used to provide a DC path around T2 and to limit the collector current through transistor 44. Resistor 52 is small enough to provide sufficient DC current through transistor 44 to make it operational and large enough not to interfere with the audio signal. Thus the voice frequency interconnection between the central office and the subscriber loop provides for voice frequency transmission only during the answer state. The loop is isolated from the voice frequency interconnection during all other states, which simplifies the dial pulsing function.

What is claimed is:
1. In a circuit for providing floating battery feed current to a subscriber loop, apparatus for disassociating an associated voice frequency circuit from the subscriber loop tip and ring leads during signaling, which comprises:
   said associated voice frequency circuit including a voice frequency transformer having a primary winding connected to a voice frequency path, and having a secondary winding;
   a DC blocking capacitor electrically connected between one terminal of said secondary winding and said ring lead;
   a dial pulse originating channel unit means having input leads connected to said voice frequency path and having a control lead on which appears a signal of one binary state to indicate the termination of dial pulsing and after a prolonged delay an output signal of the other binary state; and
   transfer means electrically connected between the other terminal of said secondary winding and said tip lead, said transfer means being responsive to the output state signal on said control lead so as to insulate the voice frequency circuit from the tip and ring leads when dial pulsing occurs.

2. Apparatus as set forth in claim 1 wherein said transfer means comprises:

isolating means having an input for connection to said control lead and being responsive to signals thereon so as to provide a control signal at an output; and switching means having first and second output terminals connected, respectively to the tip and ring leads and having a control input to receive said control signal and being responsive thereto to open switch means during dial pulses.

3. Apparatus as set forth in claim 2 wherein said isolating means comprises:

an optical isolator circuit comprising:

a light emitting diode which has an anode for receiving the signal from the control lead and has the cathode connected to ground; and a light sensitive transistor which has emitter and collector leads for connection to the tip and ring leads, thereby obtaining operating power from the floating battery feed circuit, said light sensitive transistor being turned on by light from said light emitting diode, so as to provide said control signal.

4. Apparatus as set forth in claim 3 wherein said switch means comprises:

a second transistor having an emitter connected to said tip lead, the collector connected to one terminal end of a resistor, which limits current through a collector, the other terminal end of said resistor being connected to said ring lead, and a base accepting accept the control signal whereby base bias is changed so that the second transistor is turned off during dial pulsing to insulate the associated voice frequency circuit from the subscriber loop.

* * * * *